Aug. 19, 1924.
G. CONSTANTINESCO
PIPE CONNECTION
Filed Sept. 30, 1922
1,505,543
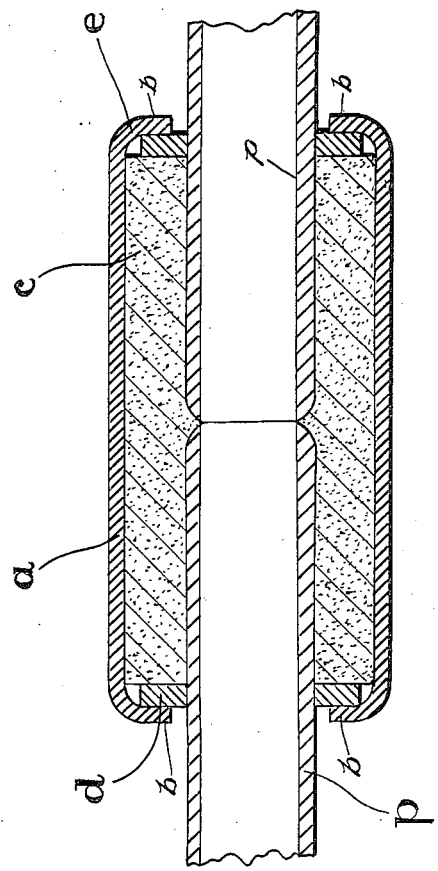
Inventor
George Constantinesco
Atty Patented Aug. 19, 1924.

1,505,543

UNITED STATES PATENT OFFICE.

GEORGE CONSTANTINESCO, OF WEYBRIDGE, ENGLAND.

PIPE CONNECTION.

Application filed September 30, 1922. Serial No. 591,631.

*To all whom it may concern:*

Be it known that I, GEORGE CONSTANTINESCO, a subject of the King of Great Britain and Ireland, residing at "Carmen Sylva," Beechwood Avenue, Oatlands Park, Weybridge, in the county of Surrey, England, have invented certain new and useful Improvements in Pipe Connections, of which the following is a specification.

The present invention relates to pipe connections in metal pipes.

The object of the invention is to provide a connector by which a tight joint can be made between the ends of the two metal pipes in a very ready and convenient manner. The connector may be applied to pipe joints in pipes carrying air or other gases or vapours; or water, petrol or other liquids, under pressure or vacuum.

The invention consists in a pipe joint comprising a metal connecting piece of cylindrical form enclosing a sleeve of rubber fitting closely within it, and around the pipe ends, the rubber being held in position at one or both ends by washers inserted at the ends of the cylindrical member which is provided with flanges which hold the washer or washers in place, the washers being of slightly smaller diameter than the cylinder so that they are permitted a lateral movement, while round their inner circumference they fit tightly on the pipes which are to be connected.

The invention is illustrated in the accompanying drawing, in which, the figure is a longitudinal sectional view illustrating the application and construction of the improved connector.

The improved connector consists in a cylindrical brass sleeve *a* of length somewhat greater than its diameter is fitted with a rubber sleeve *c* and washers *d* of slightly smaller diameter than the sleeve are placed in contact with the rubber at the two ends of the sleeve. The ends *b* of the brass sleeve are then spun over so that they hold the washers in place. The internal circumference of the washers is a tight fit on the pipes *p* to be connected, but owing to the external diameter of the washers being smaller than the internal diameter of the sleeve, the washers are allowed lateral movement so that a flexible joint is provided in which the rubber is entirely protected by metal when the pipes are inserted.

The ends of the tubes *p* inserted in the connections butt against each other and are held firmly by the compressed rubber. If petrol or liquid or gas which affects rubber is to be passed through the tubes, the ends of the pipes may be coned so that one fits within the other thus forming a somewhat tighter metal joint. It is not essential, however, that the metal joint should be perfect. If there is leakage, the effect produced by the liquid carried is to cause the rubber to swell and as this is prevented by the surrounding case and ends of the connector, the effect of leakage between the ends of the pipe is merely to make a tighter joint. It will be seen that the connector may be applied to a very large number of purposes and is suitable for carrying water, petrol, or other liquids or gases and will withstand considerable pressure or may be used under vacuum.

I claim—

A fitting for connecting smooth ended pipes comprising in combination a rubber sleeve adapted to fit closely to the pipe ends to be connected, a metal sleeve fitting closely on said rubber sleeve, washers fitting tightly on the metal pipes to be connected and of smaller external diameter than the internal diameter of said metal sleeve, the ends of said external sleeve being spun or pressed over to enclose said washers and said rubber sleeve and adapted to hold said washers in place whereby said rubber sleeve is completely enclosed in metal as set forth.

In testimony whereof I affix my signature.

GEORGE CONSTANTINESCO.